United States Patent [19]
Benjamin

[11] Patent Number: 5,826,371
[45] Date of Patent: Oct. 27, 1998

[54] BURNER UNIT PRINCIPALLY FOR FLAME CULTIVATION OF BLUEBERRIES

[76] Inventor: William Richard Benjamin, 17, Chamberlain St., Amherst, Nova Scotia, Canada, B4H 1J9

[21] Appl. No.: 411,466

[22] Filed: Mar. 28, 1995

[51] Int. Cl.⁶ .................................................. A01M 15/00
[52] U.S. Cl. ............................................................ 47/1.44
[58] Field of Search ..................... 47/1.44, 1.01

[56] References Cited

U.S. PATENT DOCUMENTS

| | | | |
|---|---|---|---|
| 610,612 | 9/1898 | Setter | 47/1.44 |
| 659,870 | 10/1900 | Jones | 47/1.44 |
| 1,322,459 | 11/1919 | Mattern | 47/1.44 |
| 1,436,958 | 11/1922 | Herbert | 47/1.44 |
| 3,164,927 | 1/1965 | Holloway | 47/1.44 |
| 3,626,636 | 12/1971 | Wheeler | 47/1.44 |
| 3,805,766 | 4/1974 | Hammon | 47/1.44 |
| 4,239,030 | 12/1980 | Benson | 47/1.44 |
| 5,189,832 | 3/1993 | Hoek et al. | 47/1.44 |

FOREIGN PATENT DOCUMENTS

| | | | |
|---|---|---|---|
| 129211 | 9/1948 | Australia | 47/1.44 |
| 794812 | 2/1936 | France | 47/1.44 |
| 2156065 | 10/1985 | United Kingdom | 47/1.44 |

*Primary Examiner*—Michael J. Carone
*Assistant Examiner*—Joanne C. Downs
*Attorney, Agent, or Firm*—Jones, Tullar & Cooper, P.C.

[57] ABSTRACT

A burner unit suitable for use in the burning of blueberry bushes comprises a frame having a front end attachable to a vehicle and a support device such as a roller for supporting the frame above the ground, the rear end of the frame carrying a generally vertically orientated combustion chamber supported above the ground. At least a part of the combustion chamber diverges laterally from an upper end towards a bottom outlet while maintaining a relatively narrow fore-and-aft dimension throughout its height, and such that the bottom outlet has a fore-and-aft dimension less than a quarter its width. An oil burner is mounted at the upper end of the combustion chamber and is directed downwardly, the shape of the combustion chamber and the positioning of the burner being such that flames from the burner are distributed across the width of the outlet, and are capable of producing temperatures at ground level suitable for flame cultivation of blueberry bushes, over the whole width of the frame.

14 Claims, 2 Drawing Sheets

BURNER UNIT PRINCIPALLY FOR FLAME CULTIVATION OF BLUEBERRIES

BACKGROUND OF THE INVENTION

1. Field of the Invention

The present invention relates to a burner unit principally designed for the flame cultivation of blueberry bushes, but which also has application to other uses, for example the burning of weeds. The invention provides a relatively small and light unit, capable of being towed behind an all-terrain vehicle (ATV).

2. Prior Art

In the cultivation of blueberry bushes, it is known that periodic burning is beneficial and that for example blueberries do well after a forest fire. It appears that blueberry seeds, which lie in the ground, need a fairly intense heat for their germination. Periodic burning also destroys weeds and insect larvae. It has become the custom for blueberry farmers to burn their bushes in spring time, every two years. Although the bushes are reduced to ash by this treatment, they grow back well and produce a good crop the following year.

In the past, the blueberry bushes have been burnt by units designed for weed burning, generally using open-flame burners of the flame thrower type, which may be mounted on a trailer along with the fuel supply. These are wasteful of fuel and do not reliably produce sufficient temperature in the ground to ensure germination of seeds. Also, the trailer mounted units often include a 200 gallon oil tank, which means that the total weight of the unit with oil may be around 2 tons, so that these units usually require a large tractor for towing.

Blueberry bushes have also been burnt using agricultural burners designed for other purposes, such as clearing of weeds and flame cultivation of crops, and having combustion chambers which partially enclose the flames. The following patents show examples of such machines:

U.S. Pat. No. 2,190,175, issued Feb. 13, 1940 to Roche;
U.S. Pat. No. 2,882,889, issued Apr. 21, 1959 to Shiplet;
U.S. Pat. No. 3,382,864, issued May 14, 1968 to Fannin et al;
U.S. Pat. No. 4,034,739, issued Jul. 12, 1977 to Bockelman;
Canadian Pat. 207,147, issued Jan. 4, 1921 to Mattern;
Canadian Pat. 208,316, issued Feb. 8, 1921 to Demeter; and
Canadian Pat. 933,826, issued Sep. 18, 1973 Yaremcio.

These patents show typical agricultural burners which are designed to be towed by a tractor over a field. They are expensive, and require a fairly large towing vehicle which is also relatively expensive. Also, they are designed for use on relatively flat fields, and are not well adapted for use on blueberry lots which are often rough and hilly. Furthermore, they are usually not suited to use on ground which is soft, and the ground is usually softest in the spring when the burning of blueberries is required. These machines tend to be inefficient both in terms of fuel consumption, and in the fact that the heat produced is spread out over a fairly large area, and may not produce temperatures required for the blueberry germination.

The present invention has as its objects to provide a machine for flame cultivation of blueberry bushes, which is inexpensive enough to be bought by blueberry farmers, which produces the high ground temperatures required for blueberry germination, which is light enough to be towed by an ATV, and which has reasonable fuel efficiency.

SUMMARY OF THE INVENTION

In accordance with one aspect of the present invention, there is provided a burner unit suitable for use in the burning of blueberry bushes, comprising:

a) a frame having a front end attachable to a vehicle and having a rear end, b) support means, preferably rotary support means such as a roller, for supporting the frame above the ground;

c) a generally vertically oriented combustion chamber supported at the rear end of the frame, the combustion chamber having an upper end and a bottom outlet which occupies most of the width of the frame, the width of the bottom outlet being at least four times greater than its fore-and-aft dimension, and d) oil burner means mounted at the upper end of the combustion chamber and directed downwardly, the shape of the combustion chamber and the positioning of the burner means being such that flames from the burner means are distributed across the width of the outlet, and are capable of producing temperatures at ground level suitable for flame cultivation of blueberry bushes over the whole width of the frame.

Preferably, the combustion chamber has lateral side walls parts of which diverge, and it may also have front and rear wall portions which converge downwardly towards the bottom outlet. The downblast design gives the advantage of a shrouded flame with a small combustion chamber.

To give suitable concentration of heat, the bottom outlet has a fore-and-aft dimension which is preferably less than 6 inches, and may be less than 4 inches. This dimension is usually less than 20% of the outlet width, and preferably less than 15% of its width. The support means is positioned to support the bottom outlet no more than 4 inches above ground it contacts, and the capacity of the burner means, and the geometry of the combustion chamber, are such as to be capable of producing a minimum temperature of 1,000° F., and preferably 1,100° F., at the surface of the ground under the bottom outlet. The flame temperature must be sufficient to ignite the blueberry bushes under suitable weather conditions, when towed at normal speed of about 3 mph.

The burner means may be a single oil burner mounted at a center of the upper end of the combustion chamber, and an upper heat shield may be provided between the combustion chamber and the burner, this heat shield overlying a major part of the width of the combustion chamber and extending both in front of and behind the chamber. A lower heat shield is also provided, extending across the frame in front of the combustion chamber, and sloping downwardly towards the bottom outlet of the combustion chamber.

The frame may include fore-and-aft parallel side members, each side member having a front end attachable to a towing vehicle, with the support means and combustion chamber occupying substantially the width of the side members. This allows two or more of the units to be connected together, side-by side, behind a towing vehicle, with the combustion chambers close enough for flames from their bottom outlets to give a continuous line of heat across the overall width of the units at a temperature sufficient for flame cultivation of blueberry bushes. The frame preferably has a width no more than 30 inches or 76 cm.

Unlike with known agricultural burners, the unit of this invention has no oil tank; it is designed to be supplied with oil from a tank carried by a towing vehicle; one tank on a vehicle can supply several units. This allows the units to be made quite light, for example less than 250 pounds or less than 200 pounds.

BRIEF DESCRIPTION OF THE DRAWINGS

A preferred embodiment of the invention will now be described, by way of example, with reference to the accompanying drawings, in which.

DETAILED DESCRIPTION

Figure 1:
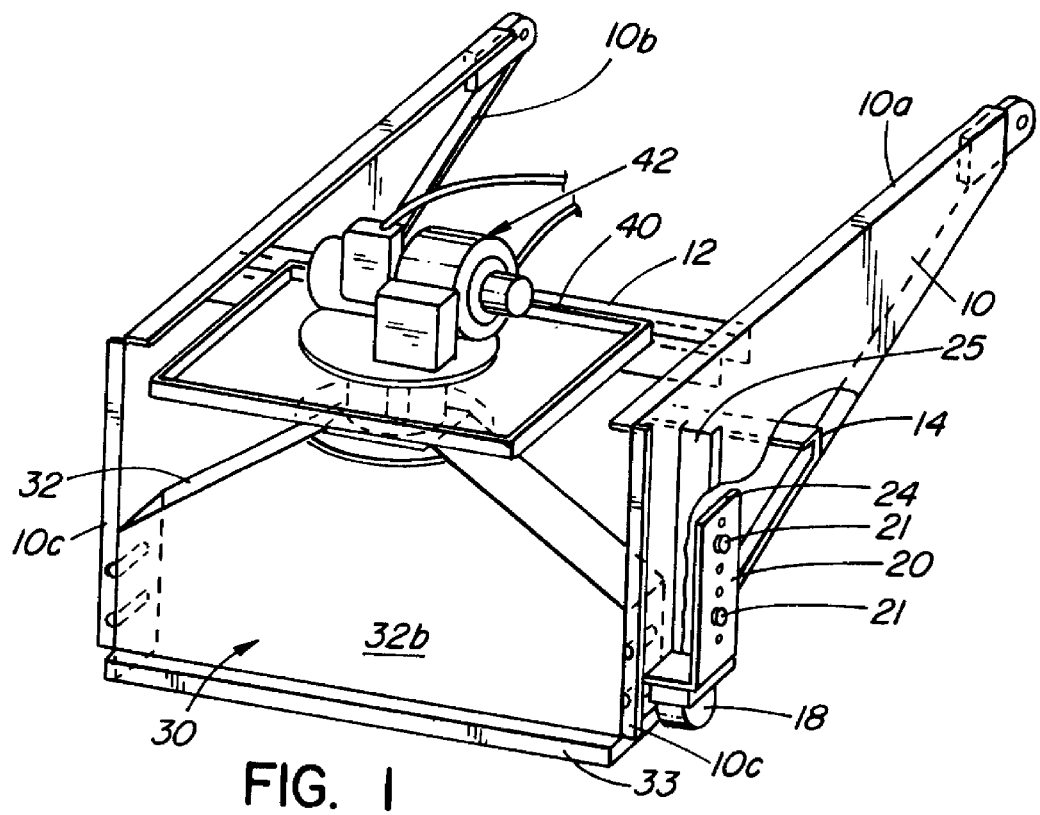
FIG. 1 shows a perspective rear view of the burner unit, with one side member partially cut away, and without the oil burner in place.

Referring to the drawings, the unit has a frame made up of two upright, parallel, fore-and-aft extending side members 10, which are formed of triangular sheet steel plates having inturned upper and lower flanges 10a and 10b, and an outwardly turned rear flange 10c. These side members are connected by transverse spacer channel 12 extending between upper portions of the side members, to the rear of their centers. At its center, this has a lifting eye 13. A lower heat shield 14 also connects the lower edges of the side members, extending from near the center of the side members, and terminating about 4 inches from their rear ends. At their front ends, the side members have apertured hinges 11 for connection to a towing vehicle.

The frame is supported, between its ends and below heat shield 14, by a transverse roller 16 having an axle 17 carried at each of its ends by a pillow block 18 held by an inwardly bent part 20' of a roller support 20. This support has a main, vertically extending upper portion which is bolted at 21 to the outside of the adjacent side member 10; several bolt holes are provided for adjustment of the height of the roller. A plate 24 is provided on the inside of the side member, opposite the position of support 20, to act as reinforcement of the side member. The arrangement is such that the roller is contained wholly within the width of the side members, and allows two or more units to be connected side-by-side without their rollers interfering with each other. At one side (only) of the unit, a vertical spacer channel 25 is welded to the outside of the side member 10; this maintains a minimum distance between adjacent units and prevents interference between parts 20,21 of such units. A skid plate 26 is welded to the lower heat shield 14, and has a downwardly sloping lower surface which has its rear end in front of the vertical center of the roller and which is effective to guide the roller over obstacles and deep ruts and to prevent rocks coming between the roller and the lower heat shield.

The rear ends of the side members are provided with horizontal, upper and lower slots 28, open at their rear ends. These receive bolts 29 which support a combustion chamber 30, having walls of sheet steel. The chamber has an upper portion with lateral shoulders 32 which diverge sideways from an upper end, and has a lower portion which has narrow vertical lateral walls which receive the bolts 29. At an upper part of the chamber, front and rear walls 32a and 32b of the chamber are fairly close together, for example about 4 inches apart, and below this the walls converge downwardly, the front wall being inclined inwardly at an angle of about 10°, or slightly less, while the rear wall is vertical. These walls produce a bottom outlet 30a having a fore-and aft dimension which is quite small, for example about 3 inches, compared to the overall lateral width of the chamber, which is typically 20 to 30 inches, and preferably from 20 to 25 inches. In the preferred embodiment, the fore-and-aft dimension of the outlet is between 12% and 15% of its width. The lower edges of the front and rear walls are reinforced by square tubes 33.

Figure 4:
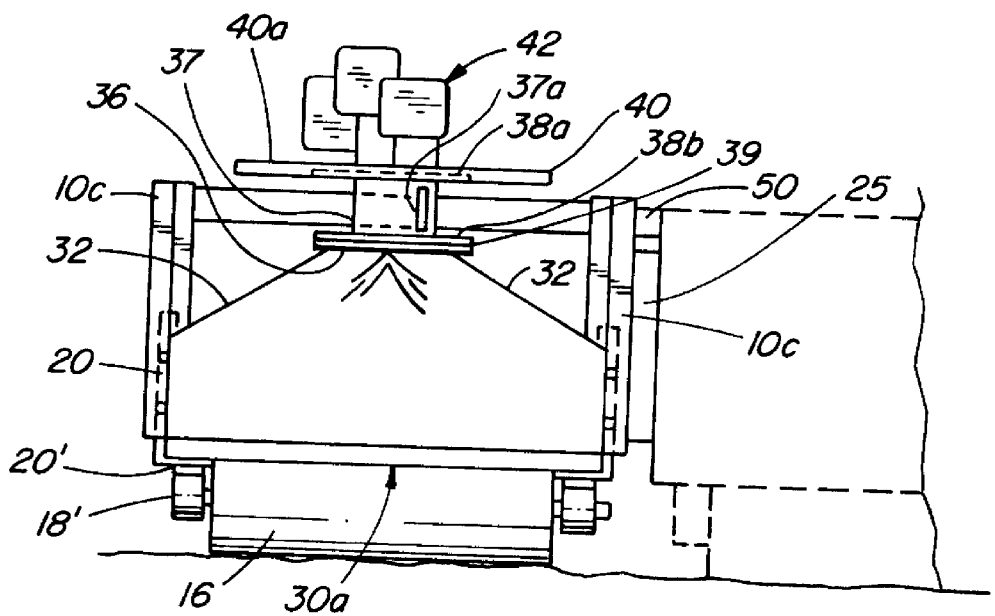
FIG. 4 shows a rear view of the unit, and also indicates, in broken lines, how a second unit may be used side-by-side with a first unit.
Figure 2:
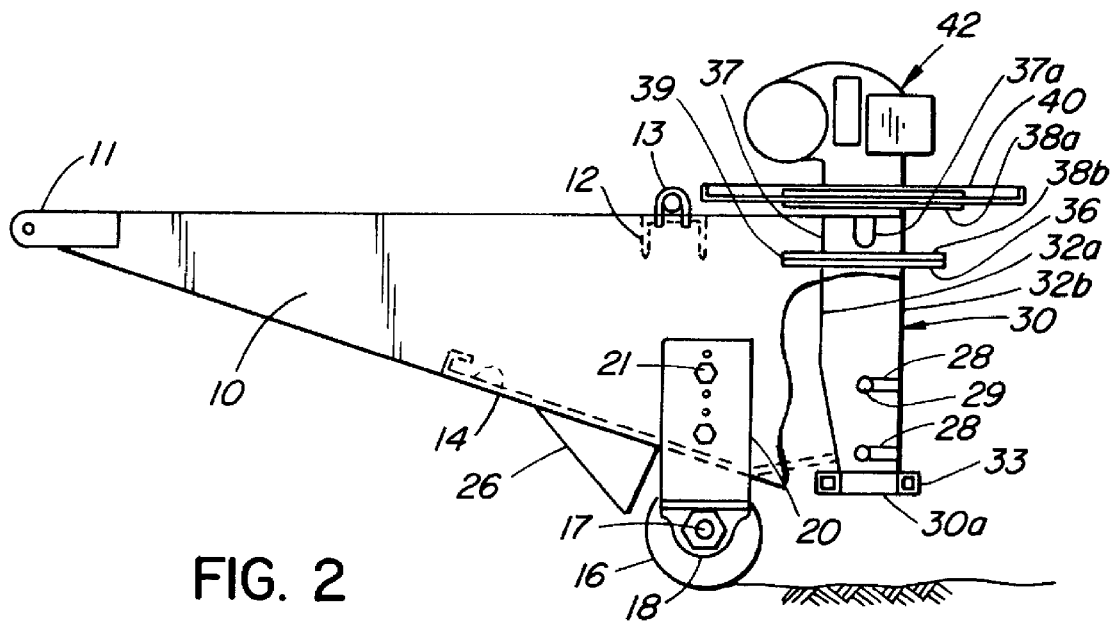
FIG. 2 shows a side view of the unit.
Figure 3:
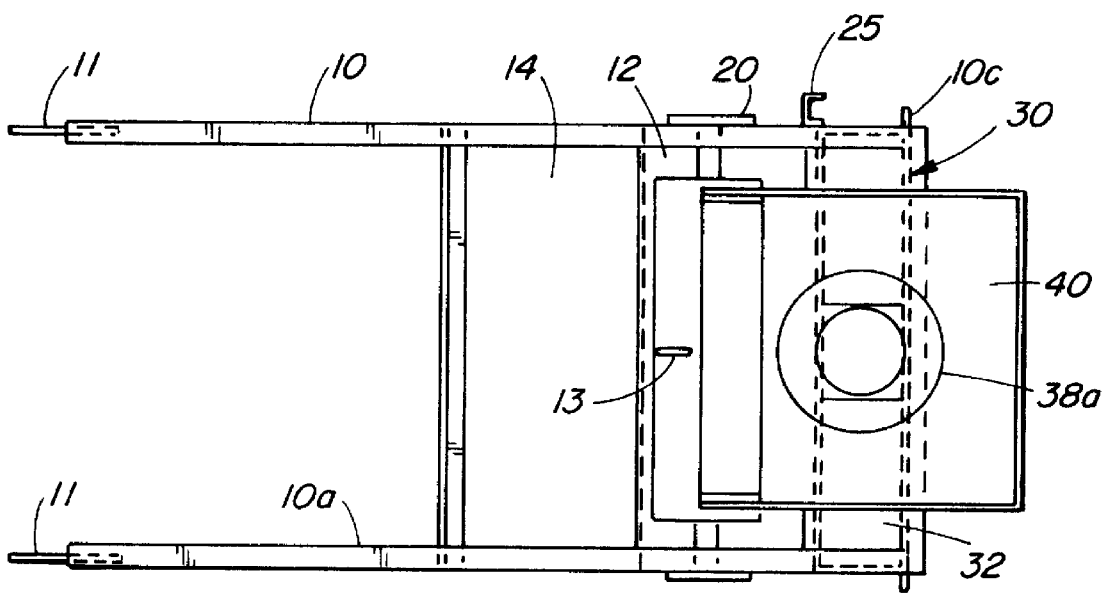
FIG. 3 shows a top plan view of the unit, again without the oil burner in place.

The upper end of the combustion chamber 30 has a circular aperture, with a diameter slightly less than the spacing of the front and rear walls, and to this is welded a circular flange 36, having bolt holes. Flange 36 carries a support tube 37 having similar flanges 38a and 38b welded to its upper and lower ends, the lower of these flanges 38b being bolted on to flange 36, but separated from this flange 36 by two collars 39 of insulating material. The upper flange 38a carries a rectangular heat shield 40, having upturned edges 40a, and above that is mounted the standard flange of an oil burner 42, mounted vertically so as to produce flames directed downwardly into the chamber. This burner is a standard furnace burner with a flame retention cone, equipped with a blower fan, and capable of being connected to a fuel tank and 110 volt electrical generator carried by an ATV (not shown). The burner preferably has a capacity of 3.6 U.S. gallons per hour, giving an input of 504,000 B.T.U. per hour. An oil burner sold under the trademark "AEROdynamic", Model FAFC is suitable. The efficiency of this burner is such that it can be expected to deliver an output of at least 400,000 BTU per hour. The length of the support tube 37 is similar to the length of the burner blast tube so that, as indicated in FIG. 4, the burner nozzle is located at the top of the combustion chamber, at a height above the outlet of about one half the width of the outlet; for example the height may be 12 inches where the outlet is 24 inches wide. This allows the standard 80° spray cone to cover the width of the outlet and to produce heat over a swath slightly wider than the burner unit.

The tube 37 has slots 37a in its sides which allow cooling of the oil burner blast tube within, and this along with the insulating collars 39 reduces conduction of heat from the combustion chamber to the burner body. The burner is further protected from excessive heat rising from the combustion chamber by the upper heat shield 40, which extends across most of the width of the combustion chamber, and beyond its front and rear walls.

In operation, one or two of these burner units may be hitched to a transverse member 50 carried at the rear end of an ATV, and towed over a blueberry field, while heat coming from the bottom outlets of the combustion chambers burns the blueberry bushes and causes germination of the seeds. Alternatively, six or eight units can be towed by a large tractor. When two or more units are being towed, these can tilt independently about member 50, to better follow the contours of the ground. The supports 20 are adjusted so that the bottom outlet of the combustion chamber is always within 2 to 4 inches of the ground. Experiments have shown that for flame cultivation of blueberry bushes, especially the germination of the seeds, a temperature of at least 1,000° to 1,100° F. is required, as measured by a thermocouple at ground level. The burner unit of this invention has been found to produce temperatures of this order, at the ground level, when towed at normal towing speed, around 3 mph. The flames from the burner can be observed to spread a few inches beyond the outlet of the combustion chamber. This is sufficient to ignite blueberry bushes under normal conditions. When burning is finished, the oil supply is shut off, but the burner blower is kept running to cool the burner and purge the fumes.

The slots 28 allow fairly easy removal of the combustion chamber, so that it can be easily replaced after uncoupling its flange 36 from the support tube flange. These slots also allow the combustion chamber to move rearwards, relative to the side members, if it hits an obstacle, limiting damage.

All parts of this unit are relatively light, and preferably the whole unit, including the oil burner, weighs less than 200 pounds, specifically about 160 pounds. There is no need for the oil tank carried by the ATV to be large; a tank of 16 or 22 gallons is sufficient.

I claim:

1. A burner unit suitable for use in the burning of blueberry bushes, comprising:
   a) a frame having a front end suitable for attachment to a towing vehicle and having a rear end,
   b) support means between said front and rear ends of the frame for supporting the frame above the ground,
   c) a generally vertically oriented combustion chamber supported above the ground at the rear end of the frame, at least a part of said combustion chamber diverging laterally from an upper end towards a bottom outlet while maintaining a relatively narrow fore-and-aft dimension throughout the combustion chamber height, and such that said bottom outlet has a fore-and-aft dimension less than a quarter the bottom outlet width, and
   d) oil burner means mounted at the upper end of said combustion chamber and directed downwardly, the shape of the combustion chamber and the positioning of the burner means being such that flames from the burner means are distributed across the bottom outlet width, and are capable of producing temperatures at ground level suitable for flame cultivation of blueberry bushes, over the whole width of the frame;
   wherein said burner means is a single oil burner mounted at a center of the upper end of the combustion chamber, and wherein a heat shield is provided between the combustion chamber and the burner means, this heat shield overlying a major part of the width of the combustion chamber bottom outlet and extending both in front of and behind the chamber.

2. A burner unit according to claim 1, wherein the combustion chamber has front and rear wall portions which converge downwardly towards the bottom outlet.

3. A burner unit according to claim 1, wherein the bottom outlet has a fore-and-aft dimension less than 6 inches.

4. A burner unit according to claim 1, wherein the bottom outlet has a fore-and-aft dimension less than 4 inches.

5. A burner unit according to claim 1, wherein the bottom outlet has a fore-and-aft dimension less than one sixth its width.

6. A burner unit according to claim 1, wherein said support means is positioned to support said bottom outlet no more than 4 inches above the ground, and wherein the capacity of the burner means, and the geometry of the combustion chamber, are such as to be capable of producing a minimum temperature of 1,000° F. at the surface of the ground under the bottom outlet.

7. A burner unit according to claim 6, wherein the said minimum temperature is at least 1,100° F.

8. A burner unit according to claim 1, wherein said frame includes fore-and-aft parallel side members, each side member having a front end suitable for attachment to a towing vehicle, and wherein said support means and combustion chamber occupy substantially the width between the side members, whereby two or more of said units can be connected together, side-by side, behind a towing vehicle, with the combustion chambers close enough for flames from their bottom outlets to give a continuous line of heat across the overall width of the units at a temperature sufficient for flame cultivation of blueberry bushes.

9. A burner unit suitable for use in the burning of blueberry bushes, comprising:
   a) a frame having fore-and-aft side members, each side member having a front end with means for attachment to a towing vehicle and having a rear end,
   b) roller support means between the front and rear ends of the frame for supporting the frame above the ground, said roller support means being substantially between the side members,
   c) a generally vertically oriented combustion chamber supported at the rear end of the frame, and occupying most of the width between the side members, said combustion chamber diverging laterally from an upper end towards a bottom outlet and having an overall width occupying most of the space between the side members and having a relatively narrow fore-and-aft dimension throughout the combustion chamber height which is less than one quarter the overall width,
   d) oil burner means mounted at the upper end of said combustion chamber and directed downwardly, the shape of the combustion chamber and the positioning of the burner means being such that flames from the burner means can be distributed across the width of said bottom outlet and can produce temperatures at the ground level suitable for flame cultivation of blueberry bushes,
   wherein all of the parts of the burner unit are substantially within the side members, whereby several of said units can be connected side-by-side and pulled by a single towing vehicle;
   and wherein said burner means is a single oil burner mounted at a center of the upper end of the combustion chamber, and wherein a heat shield is provided between the combustion chamber and the burner means, this heat shield overlying a major part of the width of the combustion chamber bottom outlet and extending both in front of and behind the chamber.

10. A burner unit according to claim 9, having an overall width of no more than 30 inches or 76 cm.

11. A burner unit according to claim 9, which weighs no more than 250 pounds.

12. A burner unit suitable for use in the burning of blueberry bushes, comprising:
   a) a frame having a front end suitable for attachment to a towing vehicle and having a rear end,
   b) support means between the ends of the frame for supporting the frame above the ground,
   c) a generally vertically oriented combustion chamber supported above the ground at the rear end of the frame, at least a part of said combustion chamber diverging laterally from an upper end towards a bottom outlet while maintaining a relatively narrow fore-and-aft dimension throughout the combustion chamber height, and such that the bottom outlet has a fore-and-aft dimension less than a quarter the bottom outlet width, and
   d) oil burner means mounted at the upper end of said combustion chamber and directed downwardly, the shape of the combustion chamber and the positioning of the burner means being such that flames from the burner means are distributed across the bottom outlet width, and are capable of producing temperatures at ground level suitable for flame cultivation of blueberry bushes, over the whole width of the frame;

and wherein a lower heat shield is provided, extending across the frame in front of the combustion chamber, said lower heat shield sloping downwardly towards the bottom outlet of the combustion chamber.

13. A burner unit suitable for use in the burning of blueberry bushes, comprising:

a) a frame having fore-and-aft side members, each side member having a front end with means for attachment to a towing vehicle and having a rear end, b) roller support means between the front and rear ends of the frame for supporting the frame above the ground, said roller support means being substantially between the side members, c) a generally vertically oriented combustion chamber supported at the rear end of the frame, and occupying most of the width between the side members, said combustion chamber diverging laterally from an upper end towards a bottom outlet and having an overall width occupying most of the space between the side members and having a relatively narrow fore-and-aft dimension throughout the combustion chamber height which is less than one quarter the overall width, d) oil burner means mounted at the upper end of said combustion chamber and directed downwardly, the shape of the combustion chamber and the positioning of the burner means being such that flames from the burner means can be distributed across the width of said bottom outlet and can produce temperatures at the ground level suitable for flame cultivation of blueberry bushes, wherein all of the parts of the burner unit are substantially within the side members, whereby several of said units can be connected side-by-side and pulled by a single towing vehicle;

and wherein a lower heat shield is provided in front of the combustion chamber and extending across the frame, said lower heat shield sloping downwardly towards the bottom outlet of the combustion chamber.

14. A burner unit suitable for use in the burning of blueberry bushes, comprising:

a) a frame having fore-and-aft side members, each side member having a front end with means for attachment to a towing vehicle and having a rear end, b) roller support means between the ends of the frame for supporting the frame above the ground, said roller support means being substantially between the side members, c) a generally vertically oriented combustion chamber supported at the rear end of the frame, and occupying most of the width between the side members, said combustion chamber diverging laterally from an upper end towards a bottom outlet and having an overall width occupying most of the space between the side members and having a relatively narrow fore-and-aft dimension throughout the combustion chamber height which is less than one quarter the bottom outlet width, d) oil burner means mounted at the upper end of said combustion chamber and directed downwardly, the shape of the combustion chamber and the positioning of the burner means being such that flames from the burner means can be distributed across the width of said bottom outlet and can produce temperatures at the ground level suitable for flame cultivation of blueberry bushes, wherein all of the parts of the burner unit are substantially within the side members, whereby several of said units can be connected side-by-side and pulled by a single towing vehicle;

and wherein a skid plate is provided, connected to said side members, and sloping downwardly in front of said roller support means, to guide the roller support means over obstacles.

* * * * *